US 9,960,682 B2

(12) United States Patent
Yu

(10) Patent No.: US 9,960,682 B2
(45) Date of Patent: May 1, 2018

(54) SINGLE INDUCTOR POSITIVE AND NEGATIVE VOLTAGE OUTPUT DEVICE

(71) Applicant: SG MICRO CORP, Beijing (CN)

(72) Inventor: Xiang Yu, Beijing (CN)

(73) Assignee: SG MICRO CORP., Beijing (CN)

( * ) Notice: Subject to any disclaimer, the term of this patent is extended or adjusted under 35 U.S.C. 154(b) by 0 days. days.

(21) Appl. No.: 15/128,361

(22) PCT Filed: Sep. 1, 2014

(86) PCT No.: PCT/CN2014/085688
§ 371 (c)(1),
(2) Date: Sep. 22, 2016

(87) PCT Pub. No.: WO2016/029489
PCT Pub. Date: Mar. 3, 2016

(65) Prior Publication Data
US 2017/0271987 A1 Sep. 21, 2017

(30) Foreign Application Priority Data

Aug. 27, 2014 (CN) .......................... 2014 1 0429174

(51) Int. Cl.
*H02M 3/158* (2006.01)
(52) U.S. Cl.
CPC ....... *H02M 3/1588* (2013.01); *H02M 3/1582* (2013.01)
(58) Field of Classification Search
CPC ........................................ H02M 3/158–3/1588
See application file for complete search history.

(56) References Cited

U.S. PATENT DOCUMENTS 8,305,054 B2 11/2012 Chen et al.
2011/0089917 A1 4/2011 Chen et al.

FOREIGN PATENT DOCUMENTS

CN 102055315 A 5/2011
CN 102237786 A 11/2011
(Continued)

OTHER PUBLICATIONS

Texas Insturments, "Single Inductor, Multiple Output SIMO Regulator for AMOLED". Jul. 2008. pp. 1-21.*

*Primary Examiner* — Gary L Laxton
*Assistant Examiner* — Peter Novak
(74) *Attorney, Agent, or Firm* — Harness, Dickey & Pierce, P.L.C.

(57) ABSTRACT

A single inductor positive and negative voltage output device, which not only reduces a chip area, but also meets mutual independent application needs of positive and negative voltage output load currents, which includes an inductor L, one end of the inductor L is connected to the drain of a first PMOS power switch M1 and to the drain of a third NMOS power switch M3 respectively, the other end of the inductor L is connected to the drain of a second NMOS power switch M2 and to the source of a fourth PMOS power switch M4 respectively, the gates of M1, M2, M3 and M4 are respectively connected to a drive circuit (1), the source of M1 is connected to a power supply terminal VIN, the source of M2 is connected to a ground terminal (6), the source of M3 is connected to a negative voltage output end VON, the drain of M4 is connected to a positive voltage output end VOP, the negative voltage output end VON is connected to ground terminal by a negative terminal capacitor CON, the positive voltage output end VOP is connected to ground terminal by a positive terminal capacitor COP, the positive voltage output end VOP by a positive terminal feedback circuit and the negative voltage output end VON (Continued)

by a negative terminal feedback are respectively connected to the drive circuit (1) by a logic control circuit (15).

8 Claims, 3 Drawing Sheets

(56) References Cited

FOREIGN PATENT DOCUMENTS

| CN | 102710127 A | 10/2012 |
|----|-------------|---------|
| CN | 103560668 A | 2/2014 |
| WO | WO 2016/029489 | 3/2016 |

* cited by examiner

SINGLE INDUCTOR POSITIVE AND NEGATIVE VOLTAGE OUTPUT DEVICE

FIELD OF THE INVENTION

The present invention relates to positive and negative output voltage switching power conversion technology, in particular to a single inductor positive and negative voltage output device.

BACKGROUND OF THE INVENTION

A combination of a boost converter which outputs a positive voltage and a buck-boost converter which outputs a negative voltage is to produce a positive output and a negative voltage output. It needs to have four low impedance power switches inside a chip. The disadvantage is that it requires two inductors, which will increase the cost of applications and occupy a larger PCB area. A combination of a boost converter which outputs a positive voltage and a charge-pump converter which outputs a negative voltage is to produce a positive output and a negative voltage output. This needs an inductor and a flying capacitor in applications. The disadvantage is a poorer load capacity of a negative voltage charge-pump and low efficiency. At the same time, an internal circuitry of a chip is more complex, inside of the chip, it needs to have six low impedance power switches, the cost of the chip is relatively higher. The flying capacitor is used to transfer an input energy to an output capacitor in a charge-pump; the power switch is a MOS transistor which is flowed through a larger current and acts as a switch.

SUMMARY OF THE INVENTION

The present invention is directed to defects or deficiencies in the prior art, providing a single inductor positive and negative voltage output device, which requires only one inductor, no flying capacitor, inside of a chip, it requires only four power switches M1~M4, will help to reduce the chip area and cost, but also is to meet a mutual independent application need of a positive and a negative voltage output load current.

Technical solutions of the present invention are as follows:

A single inductor positive and negative voltage output device, which includes an inductor, one end of the inductor is connected to the drain of a first PMOS power switch and to the drain of a third NMOS power switch respectively, the other end of the inductor is connected to the drain of a second NMOS power switch and to the source of a fourth PMOS power switch respectively, the gates of the first PMOS power switch, the second NMOS power switch, the third NMOS power switch and the fourth PMOS power switch are respectively connected to a drive circuit, the source of the first PMOS power switch is connected to a power supply terminal, the source of the second NMOS power switch is connected to a ground terminal, the source of the third NMOS power switch is connected to a negative voltage output terminal, the drain of the fourth PMOS power switch is connected to a positive voltage output terminal, the negative voltage output terminal is connected to ground terminal by a negative terminal capacitor, the positive voltage output terminal is connected to ground terminal by a positive terminal capacitor, the positive voltage output terminal is connected to a logic control circuit by a positive terminal feedback circuit, the negative voltage output is connected to the logic control circuit by a negative terminal feedback circuit, the logic control circuit is connected to the drive circuit.

The positive terminal feedback circuit includes a first amplifier, the positive voltage output terminal is connected to the negative terminal of the first amplifier, the positive terminal of the first amplifier is connected to a reference voltage terminal, the negative terminal feedback circuit includes a second amplifier, the negative voltage output terminal is connected to the positive terminal of the second amplifier, the negative terminal of the second amplifier is connected to ground terminal, the output terminals of the first amplifier and the second amplifier are respectively connected to a feedback control voltage high-low selection circuit.

The feedback control voltage high-low selection circuit is connected to the negative terminal of a first comparator to transmit relatively high voltage, the feedback control voltage high-low selection circuit is connected to the positive terminal of a second comparator to transmit relatively low voltage, the positive terminal of the first comparator is connected to the negative terminal of the second comparator, the feedback control voltage high-low selection circuit is connected to the logic control circuit.

The output terminal of the first comparator is connected to the control logic circuit to transmit a main switching-off signal, the output terminal of the second comparator is connected to the control logic circuit to transmit an auxiliary switching-off signal.

The logic control circuit is connected to an oscillator, the oscillator transmits a clock signal to the logic control circuit, the power supply terminal is connected to the ground terminal by a power supply terminal capacitor.

The logic control circuit is connected to an oscillator, the oscillator is connected to a current detection device by a voltage adder, the current detection device is connected to a detection point which is located at the drain of the second NMOS power switch.

After the voltage adder adds a slope compensation voltage which is generated by the oscillator and a sampling voltage which is obtained by the current detection device, an output of the voltage adder is transmitted to a one-stage buffer, the one-stage buffer is respectively connected to a constant current source inside the chip, the positive terminal of the first comparator and the negative terminal of the second comparator, the constant current source inside the chip is connected with a ramp voltage charging capacitor in parallel.

The one-stage buffer includes a third amplifier, the positive terminal of the third amplifier is connected to the voltage adder, an output terminal of the third amplifier is connected to the anode of a diode, the negative terminal of the third amplifier is connected to the cathode of the diode, the cathode of the diode is connected to an input of the constant current source inside the chip, an output of the constant current source inside the chip is connected to ground terminal.

The positive voltage output terminal is connected to the positive terminal feedback circuit by a first voltage dividing network inside the chip, the negative voltage output terminal is connected to the negative terminal feedback circuit by a second voltage dividing network inside the chip.

The first voltage dividing network inside the chip includes the positive voltage output terminal, a first resistor, a second resistor and the ground terminal, which are connected in sequence, a node between the first resistor and the second resistor is connected to the negative terminal of a first amplifier, the second voltage dividing network inside the chip includes the negative voltage output terminal, a fourth resistor, a third resistor and a reference voltage terminal, which are connected in sequence, a node between the third resistor and the fourth resistor is connected to the positive terminal of a second amplifier.

Technical effects of the present invention are as follows: Single inductor positive and negative voltage output device of the present invention requires only one inductor, no flying capacitor, reducing application costs. Inside of a chip requires only four low impedance power switches, which is with a smaller chip area. At the same time it is to meet a mutual independent application need of a positive and negative voltage output load current. And the positive and negative voltage output terminal has a faster transient response to a power supply voltage variations and a faster transient response to a load changes.

The present invention has the following characteristics: 1. Less external components in applications, requiring only one inductor, no flying capacitor. 2. Inside of a chip requires only four low impedance power switches, which could achieve a positive and negative voltage output. 3. Meets a mutual independent application need of a positive and negative voltage output load. 4. The positive output terminal VOP and a negative output terminal VON response to a power supply voltage variations and response to a load changes pretty much the same, and very quickly. 5. The negative output terminal is with a strong load capacity, having high conversion efficiency.

Numerals marked are as follows: 1—drive circuit; 2—detection point; 3—current detection device; 4—a first voltage dividing network inside the chip or positive terminal voltage dividing network; 5—a second voltage dividing network inside the chip or negative terminal voltage dividing network; 6—ground terminal; 7—ramp voltage signal line; 8—a first Amplifier or positive terminal Error Operational Amplifier AP; 9—a second Amplifier or negative terminal Error Operational Amplifier AN; 10—feedback control voltage high-low selection circuit; 11—constant current source inside the chip; 12—a second Comparator; 13—a first Comparator; 14—one-stage Buffer; 15—logic control circuit; 16—Oscillator; 17—a third Amplifier; 18—data line; 19—voltage Adder; 20—period for inductive energy storage; 21—period for transferring only energy to positive voltage output terminal VOP; 22—period for transferring both energy to positive voltage output terminal VOP and negative voltage output terminal VON; 23—diode; 24—period for transferring only energy to negative voltage output terminal VON; M1—a first PMOS power switch; M2—a second NMOS power switch; M3—a third NMOS power switch; M4—a fourth PMOS power switch; L—inductor; VIN—power supply terminal; CIN—power supply terminal capacitor; R1—a first resistor; R2—a second resistor; R3—a third resistor; R4—a fourth resistor; VREF—reference voltage terminal; VOP—positive voltage output terminal; VON—negative voltage output terminal; COP—positive terminal capacitor; CON—negative terminal capacitor; Vcp—a first control amount or positive terminal feedback control voltage; Vcn—a second control amount or negative terminal feedback control voltage; Vc—feedback control voltage; Vc_high—relatively high voltage; Vc_low—relatively low voltage; Main_trip—main switching-off signal; Aux_trip—auxiliary switching-off signal; CLK—clock signal; Vramp—ramp voltage signal; SLOPE COMP—slope compensation voltage; Cr—ramp voltage charging capacitor; Ir—current of constant current source.

DETAILED DESCRIPTION OF THE INVENTION

Below in conjunction with the accompanying drawings (FIG. 1-FIG. 4) the present invention will be described.

Figure 1:
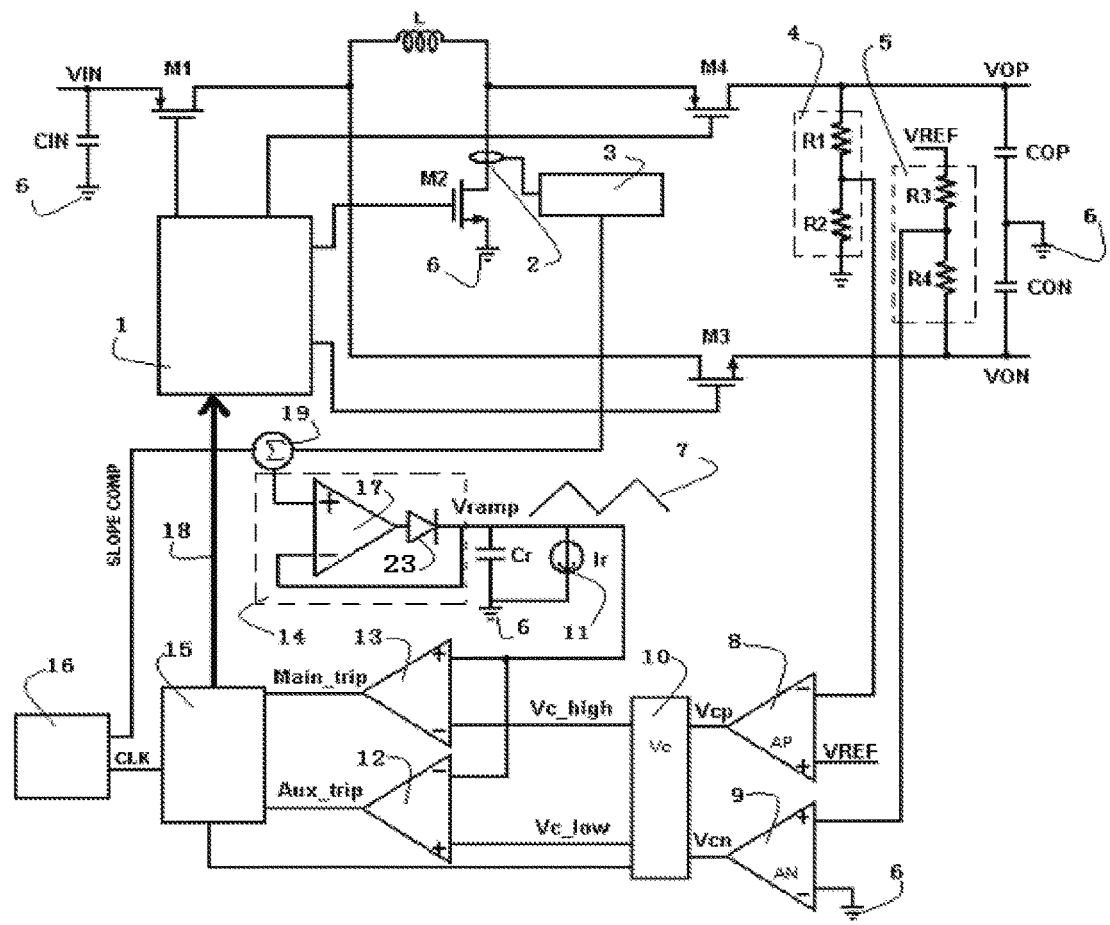
FIG. 1 schematically illustrates an embodiment of single inductor positive and negative voltage output device of the invention.

FIG. 1 schematically illustrates an embodiment of single inductor positive and negative voltage output device of the invention. As shown in FIG. 1, a single inductor positive and negative voltage output device, includes an inductor L, one end of the inductor L is connected to the drain of a first PMOS power switch M1 and to the drain of a third NMOS power switch M3 respectively, the other end of the inductor L is connected to the drain of a second NMOS power switch M2 and to the source of a fourth PMOS power switch M4 respectively, the gate s of the first PMOS power switch M1, the second NMOS power switch M2, the third NMOS power switch M3 and the fourth PMOS power switch M4 are respectively connected to a drive circuit 1, the source of the first PMOS power switch M1 is connected to a power supply terminal VIN, the source of the second NMOS power switch M2 is connected to a ground terminal 6, the source of the third NMOS power switch M3 is connected to a negative voltage output terminal VON, the drain of the fourth PMOS power switch M4 is connected to a positive voltage output terminal VOP, the negative voltage output terminal VON is connected to ground terminal by a negative terminal capacitor CON, the positive voltage output terminal VOP is connected to ground terminal by a positive terminal capacitor COP, the positive voltage output terminal VOP is connected to a logic control circuit 15 by a positive terminal feedback circuit, the negative voltage output VON is connected to the logic control circuit 15 by a negative terminal feedback circuit, the logic control circuit 15 is connected to the drive circuit 1. The positive terminal feedback circuit includes a first amplifier 8 or a positive terminal Error Operational Amplifier AP, the positive voltage output terminal VOP is connected to the negative terminal(−) of the first amplifier 8, the positive terminal(+) of the first amplifier 8 is connected to a reference voltage terminal VREF, the negative terminal feedback circuit includes a second amplifier 9 or a negative terminal Error Operational Amplifier AN, the negative voltage output terminal VON is connected to the positive terminal(+) of the second amplifier 9, the negative terminal(−) of the second amplifier 9 is connected to ground terminal, the output terminals of the first amplifier 8 and the second amplifier 9 are respectively connected to a feedback control voltage high-low selection circuit 10. The feedback control voltage high-low selection circuit 10 is connected to the negative terminal(−) of a first comparator 13 to transmit relatively high voltage Vc_high, the feedback control voltage high-low selection circuit 10 is connected to the positive terminal(+) of a second comparator 12 to transmit relatively low voltage Vc_low, the positive terminal (+) of the first comparator 13 is connected to the negative terminal(−) of the second comparator 12, the feedback control voltage high-low selection circuit 10 is connected to the logic control circuit 15. Vc refers to feedback control voltage. The output terminal of the first comparator 13 is connected to the control logic circuit 15 to transmit a main switching-off signal Main_trip, the output terminal of the second comparator 12 is connected to the control logic circuit 15 to transmit an auxiliary switching-off signal Aux_trip. The logic control circuit 15 is connected to an oscillator 16, the oscillator 16 transmits a clock signal CLK to the logic control circuit 15, the power supply terminal VIN is connected to the ground terminal 6 by a power supply terminal capacitor CIN. The logic control circuit 15 is connected to the oscillator 16, the oscillator 16 is connected to a current detection device 3 by a voltage adder 19, the current detection device 3 is connected to a detection point 2 which is located at the drain of the second NMOS power switch M2. After the voltage adder 19 adds a slope compensation voltage SLOPE COMP which is generated by the oscillator 16 and a sampling voltage which is obtained by the current detection device 3, an output of the voltage adder 19 is transmitted to a one-stage buffer 14, the one-stage buffer 14 is respectively connected to a constant current source inside the chip 11, the positive terminal(+) of the first comparator 13 and the negative terminal(−) of the second comparator 12, the constant current source inside the chip 11 is parallel connected with a ramp voltage charging capacitor Cr. The one-stage buffer 14 includes a third amplifier 17, the positive terminal(+) of the third amplifier 17 is connected to the voltage adder 19, an output terminal of the third amplifier 17 is connected to the anode of a diode 23, the negative terminal(−) of the third amplifier 17 is connected to the cathode of the diode 23, the cathode of the diode 23 is connected to an input of the constant current source inside the chip 11, an output of the constant current source inside the chip 11 is connected to ground terminal. The positive voltage output terminal VOP is connected to the positive terminal feedback circuit by a first voltage dividing network inside the chip 4, the negative voltage output terminal VON is connected to the negative terminal feedback circuit by a second voltage dividing network inside the chip 5. The first voltage dividing network inside the chip 4 includes the positive voltage output terminal VOP, a first resistor R1, a second resistor R2 and the ground terminal 6, which are connected in sequence, a node between the first resistor R1 and the second resistor R2 is connected to the negative terminal(−) of the first amplifier 8, the second voltage dividing network inside the chip 5 includes the negative voltage output terminal VON, a fourth resistor R4, a third resistor R3 and a reference voltage terminal VREF, which are connected in sequence, a node between the third resistor R3 and the fourth resistor R4 is connected to the positive terminal(+) of the second amplifier 9, the negative terminal (−) of the second amplifier 9 is connected to ground terminal. The logic control circuit 15 is connected to the drive circuit 1 by a data line 18. The one-stage buffer 14 generates a ramp voltage signal Vramp. The first amplifier 8 generates a first control amount or a positive terminal feedback control voltage Vcp. The second amplifier 9 generates a second control amount or a negative terminal feedback control voltage Vcn. Vc_high is an obtained high voltage from comparing Vcp with Vcn. Vc_low is an obtained low voltage from comparing Vcp with Vcn.

The present invention uses peak current control mode, its structure diagram as shown in FIG. 1, which is constituted by two voltage feedback loop and one current feedback loop: the positive terminal output voltage VOP is sampled by the first voltage dividing network inside the chip 4 which is constituted by the resistors R1 and R2, and is compared with the reference voltage VREF by the Error Operational Amplifier AP to generate the control amount Vcp, which constitutes a first voltage feedback loop. The negative terminal output voltage VON is sampled by the second voltage dividing network inside the chip 5 which is constituted by the resistors R3 and R4, and is compared with the ground voltage by the Error Operational Amplifier AN to generate the control amount Vcn, which constitutes a second voltage feedback loop. Vc high-low selection circuit selects the relatively high voltage Vc_high and the relatively low voltage Vc_low from Vcp and Vcn. By sampling the current flowed through the power switch M2, the current detection module is to convert a sampling current into a sampling voltage, which is added with a slope compensation voltage generated by the oscillator module, then generates Vramp signal by the one-stage buffer. A rising slope of Vramp is determined jointly by a slope of the inductor current and a slope of slope compensation amount, a down slope is determined by discharging a capacitor Cr via a current Ir. Vc_high and Vc_low compare respectively with Vramp to generate Main_trip and Aux_trip signals, which constitute the current feedback loop. Three signals CLK, Main_trip and Aux_trip together determine the on and off time of M1~M4, achieving regulation of the VOP and VON terminal by the above-mentioned feedback loop. Since the voltages of the VOP and VON terminal participate in the voltage and current feedback loop control, the VOP and VON response to a power supply voltage variations and response to a load changes pretty much the same, and both very quickly.

Below with corresponding timing control of M1~M4 when the VOP and VON terminal with the same load and different loads, various operating modes of the present invention solution will be specifically described.

Figure 2:
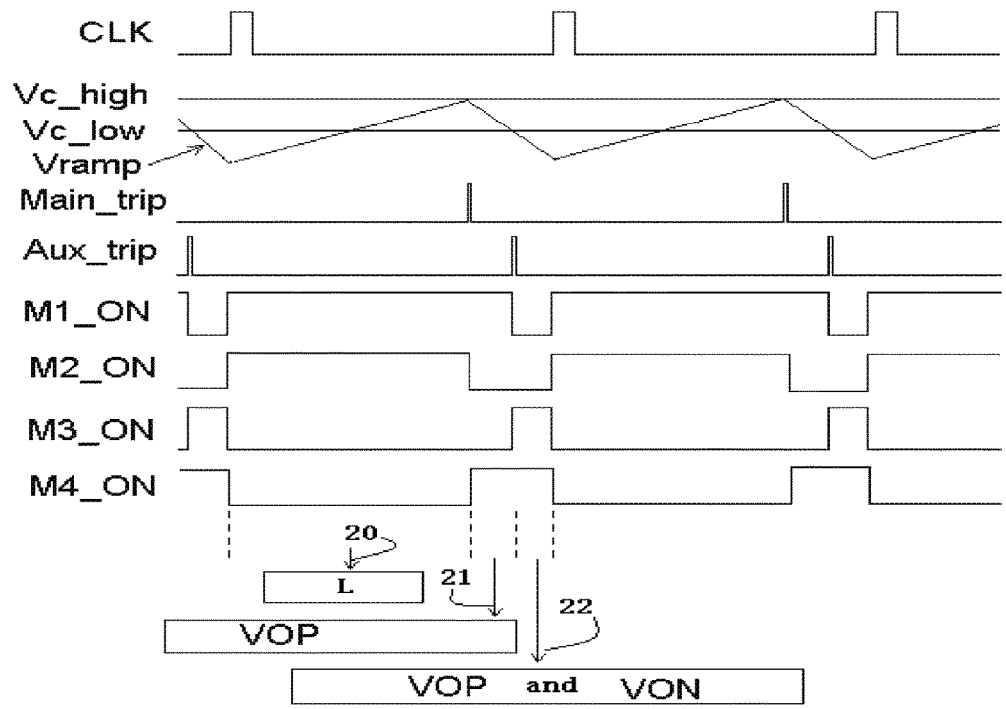
FIG. 2 schematically illustrates a control timing to four power switches M1~M4, when a load of a positive voltage output terminal VOP>a load of a negative voltage output terminal VON.

FIG. 2 schematically illustrates a control timing to four power switches M1~M4, when a load of a positive voltage output terminal VOP>a load of a negative voltage output terminal VON. As shown in FIG. 2, in the case when a load of VOP terminal is greater than a load of VON terminal, according to a load difference of the positive output terminal and the negative output terminal, the feedback loop adjusts an output of the positive output terminal Error Operational Amplifier AP to be a corresponding magnitude higher than an output of the negative output terminal Error Operational Amplifier AN, at this time, a voltage of Vc_high is equal to Vcp, a voltage of Vc_low is equal to Vcn. As shown in FIG. 2: a rising edge of CLK causes M1, M2 to be turned on, at this time VIN stores energy to inductance L via M1, M2. For example, the period for inductive energy storage 20.

A generated Main_trip causes M2 to be turned off, M4 to be turned on. At this time, an energy stored within the inductor L is to be transferred to a capacitor (COP) of VOP terminal via M1, M4. For example, the period for transferring only energy to the positive voltage output terminal VOP 21.

A generated Aux_trip causes M1 to be turned off, M3 to be turned on. At this time, an energy stored within the inductor L is to be transferred to capacitors (COP and CON) of VOP and VON terminal via M3, M4, respectively. For example, the period for transferring both energy to the positive voltage output terminal VOP and the negative voltage output terminal VON 22.

When the load of VON terminal decreases, the feedback loop causes Vcn reduce, i.e. Vc_low becomes lower, Aux_trip is to be generated even later, a switching-on time of M3 is reduced accordingly, if when the load of VON terminal approaches zero, the switching-on time of M3 also approaches zero, while M1, M2 and M4 remain on and off cycle by cycle under the control of the loop, so as to also achieve a mutual independence of VOP and VON terminal load.

Figure 3:
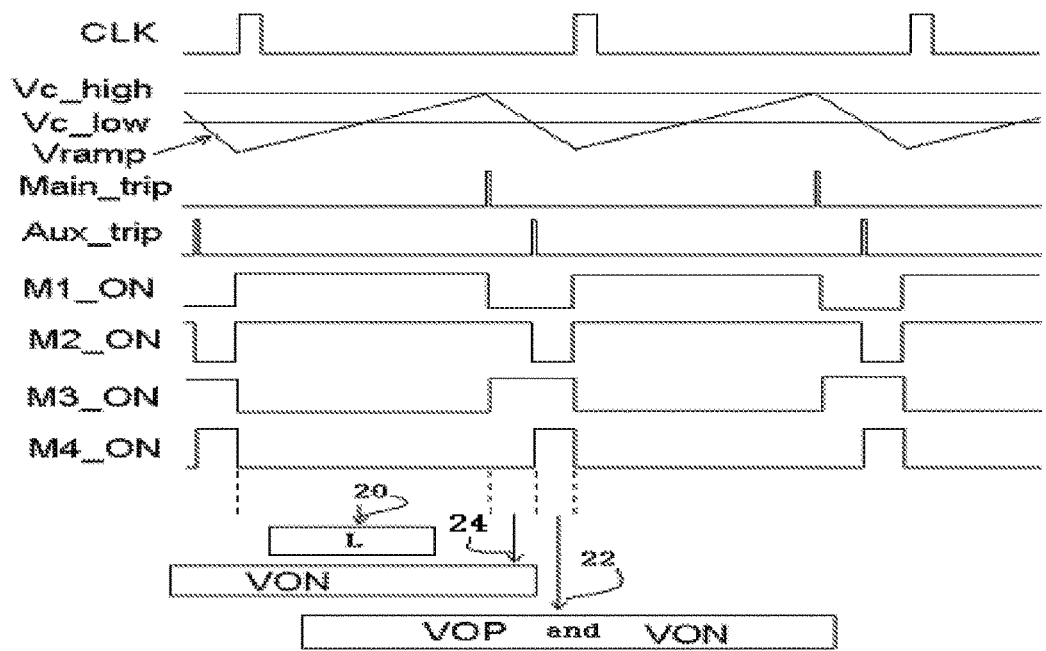
FIG. 3 schematically illustrates a control timing to four power switches M1~M4, when a load of a positive voltage output terminal VOP<a load of a negative voltage output terminal VON.

FIG. 3 schematically illustrates a control timing to four power switches M1~M4, when a load of a positive voltage output terminal VOP<a load of a negative voltage output terminal VON. As shown in FIG. 3, in the case when a load of VOP terminal is less than a load of VON terminal, according to a load difference of the negative output terminal and the positive output terminal, the feedback loop adjusts an output of the negative output terminal Error Operational Amplifier AN to be a corresponding magnitude higher than an output of the positive output terminal Error Operational Amplifier AP, at this time, a voltage of Vc_high is equal to Vcn, a voltage of Vc_low is equal to Vcp. As shown in FIG. 3: a rising edge of CLK causes M1, M2 to be turned on, at this time VIN stores energy to inductance L via M1, M2. For example a period for inductive energy storage 20.

A generated Main_trip causes M1 to be turned off, M3 to be turned on. At this time, an energy stored within the inductor L is to be transferred to a capacitor (CON) of VON terminal via M2, M3. For example, the period for transferring only energy to the negative voltage output terminal VON 24.

A generated Aux_trip causes M2 to be turned off, M4 to be turned on. At this time, an energy stored within the inductor L is to be transferred to capacitors (COP and CON) of VOP and VON terminal via M3, M4, respectively. For example, the period for transferring both energy to the positive voltage output terminal VOP and the negative voltage output terminal VON 22.

When the load of VON terminal decreases, the feedback loop causes Vcp reduce, i.e. Vc_low becomes lower, Aux_trip is to be generated even later, a switching-on time of M4 is reduced accordingly, if when the load of VOP terminal approaches zero, the switching-on time of M4 also approaches zero, while M1, M2 and M3 remain on and off cycle by cycle under the control of the loop, so as to also achieve a mutual independence of VOP and VON terminal load.

Figure 4:
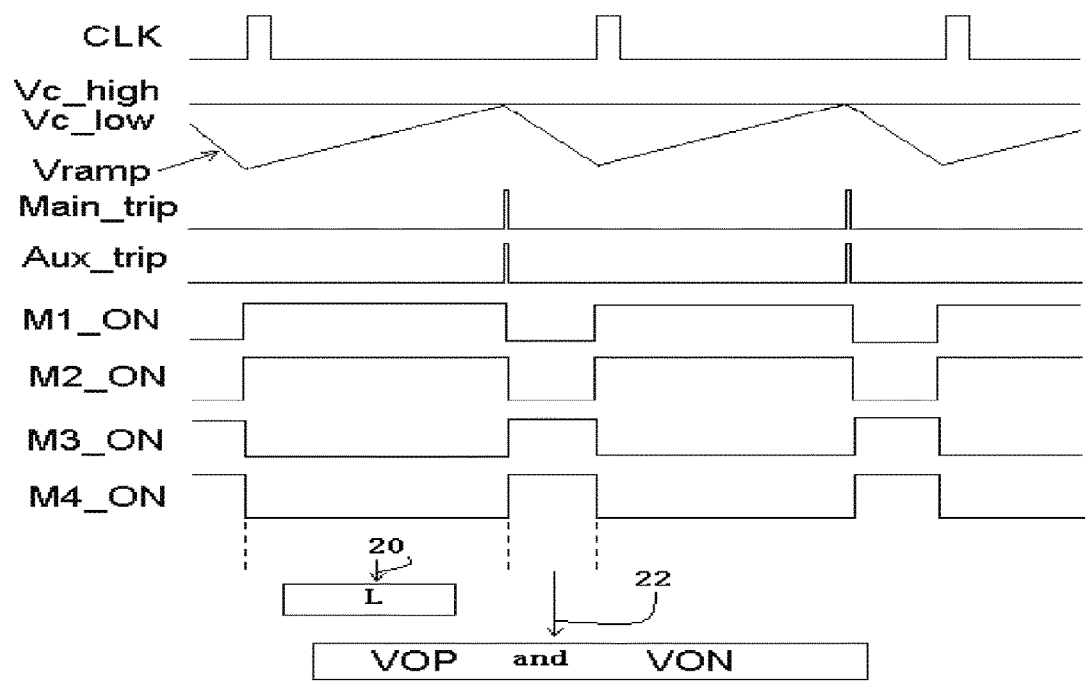
FIG. 4 schematically illustrates a control timing to four power switches M1~M4, when a load of a positive voltage output terminal VOP=a load of a negative voltage output terminal VON.

FIG. 4 schematically illustrates a control timing to four power switches M1~M4, when a load of a positive voltage output terminal VOP=a load of a negative voltage output terminal VON. As shown in FIG. 4, in the case when a load of VOP terminal is equal to a load of VON terminal, according to load conditions of the positive output terminal and the negative output terminal, the feedback loop adjusts an output of the positive output terminal Error Operational Amplifier AP to be equal to an output of the negative output terminal Error Operational Amplifier AN, at this time, Vc_high is equal to Vc_low. As shown in FIG. 4: a rising edge of CLK causes M1, M2 to be turned on, at this time VIN stores energy to inductance L via M1, M2. Main_trip and Aux_trip are generated at the same time, causes M1, M2 to be turned off at the same time, M3, M4 to be turned on at the same time, an energy stored within the inductor L is to be transferred to capacitors (COP and CON) of VOP and VON terminal via M3, M4, respectively. For example a period for inductive energy storage 20. For example, the period for transferring both energy to the positive voltage output terminal VOP and the negative voltage output terminal VON 22.

Specified here, the above statement is helpful for those skilled in the art to understand the present invention and creation, but it is not limited to the scope of protection of the invention. Any implementation carried out of equivalent replacement, modified improvement and/or deletion of simplifying to the above statement which is not out of the substantial content of the present invention, are all falling into the scope of protection of the present invention.

What is claimed is:

1. A single inductor positive and negative voltage output device, which includes an inductor, one end of the inductor is connected to the drain of a first PMOS power switch and to the drain of a third NMOS power switch respectively, the other end of the inductor is connected to the drain of a second NMOS power switch and to the source of a fourth PMOS power switch respectively, the gate s of the first PMOS power switch, the second NMOS power switch, the third NMOS power switch and the fourth PMOS power switch are respectively connected to a drive circuit, the source of the first PMOS power switch is connected to a power supply terminal, the source of the second NMOS power switch is connected to a ground terminal, the source of the third NMOS power switch is connected to a negative voltage output terminal, the drain of the fourth PMOS power switch is connected to a positive voltage output terminal, the negative voltage output terminal is connected to ground terminal by a negative terminal capacitor, the positive voltage output terminal is connected to ground terminal by a positive terminal capacitor, the positive voltage output terminal is connected to a logic control circuit by a positive terminal feedback circuit, the negative voltage output is connected to the logic control circuit by a negative terminal feedback circuit, the logic control circuit is connected to the drive circuit, the positive terminal feedback circuit includes a first amplifier, the positive voltage output terminal is connected to the negative terminal of the first amplifier, the positive terminal of the first amplifier is connected to a reference voltage terminal, the negative terminal feedback circuit includes a second amplifier, the negative voltage output terminal is connected to the positive terminal of the second amplifier, the negative terminal of the second amplifier is connected to ground terminal, the output terminals of the first amplifier and the second amplifier are respectively connected to a feedback control voltage high-low selection circuit, the feedback control voltage high-low selection circuit is connected to the negative terminal of a first comparator to transmit relatively high voltage, the feedback control voltage high-low selection circuit is connected to the positive terminal of a second comparator to transmit relatively low voltage, the positive terminal of the first comparator is connected to the negative terminal of the second comparator, the feedback control voltage high-low selection circuit is connected to the logic control circuit.

2. The single inductor positive and negative voltage output device according to claim 1, in which, the output terminal of the first comparator is connected to the control logic circuit to transmit a main switching-off signal, the output terminal of the second comparator is connected to the control logic circuit to transmit an auxiliary switching-off signal.

3. The single inductor positive and negative voltage output device according to claim 1, in which, the logic control circuit is connected to an oscillator, the oscillator transmits a clock signal to the logic control circuit, the power supply terminal is connected to the ground terminal by a power supply terminal capacitor.

4. The single inductor positive and negative voltage output device according to claim 1, in which, the positive voltage output terminal is connected to the positive terminal feedback circuit by a first voltage dividing network inside the chip, the negative voltage output terminal is connected to the negative terminal feedback circuit by a second voltage dividing network inside the chip.

5. The single inductor positive and negative voltage output device according to claim 4, in which, the first voltage dividing network inside the chip includes the positive voltage output terminal, a first resistor, a second resistor and the ground terminal, which are connected in sequence, a node between the first resistor and the second resistor is connected to the negative terminal of a first amplifier, the second voltage dividing network inside the chip includes the negative voltage output terminal, a fourth resistor, a third resistor and a reference voltage terminal, which are connected in sequence, a node between the third resistor and the fourth resistor is connected to the positive terminal of a second amplifier.

6. A single inductor positive and negative voltage output device, which includes an inductor, one end of the inductor is connected to the drain of a first PMOS power switch and to the drain of a third NMOS power switch respectively, the other end of the inductor is connected to the drain of a second NMOS power switch and to the source of a fourth PMOS power switch respectively, the gate s of the first PMOS power switch, the second NMOS power switch, the third NMOS power switch and the fourth PMOS power switch are respectively connected to a drive circuit, the source of the first PMOS power switch is connected to a power supply terminal, the source of the second NMOS power switch is connected to a ground terminal, the source of the third NMOS power switch is connected to a negative voltage output terminal, the drain of the fourth PMOS power switch is connected to a positive voltage output terminal, the negative voltage output terminal is connected to ground terminal by a negative terminal capacitor, the positive voltage output terminal is connected to ground terminal by a positive terminal capacitor, the positive voltage output terminal is connected to a logic control circuit by a positive terminal feedback circuit, the negative voltage output is connected to the logic control circuit by a negative terminal feedback circuit, the logic control circuit is connected to the drive circuit, the positive terminal feedback circuit includes a first amplifier, the positive voltage output terminal is connected to the negative terminal of the first amplifier, the positive terminal of the first amplifier is connected to a reference voltage terminal, the negative terminal feedback circuit includes a second amplifier, the negative voltage output terminal is connected to the positive terminal of the second amplifier, the negative terminal of the second amplifier is connected to ground terminal, the output terminals of the first amplifier and the second amplifier are respectively connected to a feedback control voltage high-low selection circuit, the logic control circuit is connected to an oscillator, the oscillator is connected to a current detection device by a voltage adder, the current detection device is connected to a detection point which is located at the drain of the second NMOS power switch.

7. The single inductor positive and negative voltage output device according to claim 6, in which, after the voltage adder adds a slope compensation voltage which is generated by the oscillator and a sampling voltage which is obtained by the current detection device, an output of the voltage adder is transmitted to a one-stage buffer, the one-stage buffer is respectively connected to a constant current source inside the chip, the positive terminal of the first comparator and the negative terminal of the second comparator, the constant current source inside the chip is connected with a ramp voltage charging capacitor in parallel.

8. The single inductor positive and negative voltage output device according to claim 7, in which, the one-stage buffer includes a third amplifier, the positive terminal of the third amplifier is connected to the voltage adder, an output terminal of the third amplifier is connected to the anode of a diode, the negative terminal of the third amplifier is connected to the cathode of the diode, the cathode of the diode is connected to an input of the constant current source inside the chip, an output of the constant current source inside the chip is connected to ground terminal.

* * * * *